United States Patent
Cheng et al.

(10) Patent No.: US 11,977,609 B2
(45) Date of Patent: May 7, 2024

(54) USB DEVICE IP INFRINGEMENT IDENTIFICATION METHOD AND TERMINAL BASED ON USB PROTOCOL

(71) Applicant: CORIGINE (SHANGHAI), INC., Shanghai (CN)

(72) Inventors: Kai Cheng, Zhejiang (CN); Sheng Lu, Zhejiang (CN); YirngAn Chen, Zhejiang (CN); Xin Jiang, Zhejiang (CN); Xiao Xiao, Zhejiang (CN)

(73) Assignee: CORIGINE (SHANGHAI), INC., Shanghai (CN)

( * ) Notice: Subject to any disclaimer, the term of this patent is extended or adjusted under 35 U.S.C. 154(b) by 0 days.

(21) Appl. No.: 18/270,065

(22) PCT Filed: Jan. 29, 2021

(86) PCT No.: PCT/CN2021/074379
§ 371 (c)(1),
(2) Date: Jun. 28, 2023

(87) PCT Pub. No.: WO2022/141731
PCT Pub. Date: Jul. 7, 2022

(65) Prior Publication Data
US 2023/0394121 A1    Dec. 7, 2023

(30) Foreign Application Priority Data
Dec. 29, 2020  (CN) .......................... 202011602067.4

(51) Int. Cl.
G06F 21/10   (2013.01)
G06F 13/42   (2006.01)

(52) U.S. Cl.
CPC .......... *G06F 21/10* (2013.01); *G06F 13/4282* (2013.01); *G06F 2213/0042* (2013.01)

(58) Field of Classification Search
CPC ................. G06F 21/10; G06F 13/4282; G06F 2213/0042
See application file for complete search history.

(56) References Cited

U.S. PATENT DOCUMENTS

2006/0185020 A1\* 8/2006 Levy ....................... G06F 21/34
726/27
2007/0279983 A1\* 12/2007 Nagashima ............ G11C 16/22
365/185.04

(Continued)

FOREIGN PATENT DOCUMENTS

| CN | 104123212 A | 10/2014 |
| CN | 109102436 A | 12/2018 |
| CN | 110018977 A | 7/2019 |

*Primary Examiner* — Abiy Getachew
(74) *Attorney, Agent, or Firm* — Hudak, Shunk & Farine Co. LPA (57) ABSTRACT

A USB protocol-based IP infringement identification method for USB devices, including the following steps: S1, connecting an infringement identification device at a peer side of the USB host to be tested; S2, the USB host to be tested entering compliance mode; S3, the infringement identification device sending an X.LFPS file to the USB host to be tested; S4, upon the USB host to be tested receiving the X.LFPS file, the USB host to be tested sending IP copyright information to the infringement identification device; S5, determining whether the USB host to be tested infringes the IP. The infringement identification of the USB device to be tested is performed by using the compliance mode specified in the USB protocol, which is more stable, reliable and can also save costs.

5 Claims, 6 Drawing Sheets

(56) References Cited

U.S. PATENT DOCUMENTS

| | | | |
|---|---|---|---|
| 2009/0249464 A1* | 10/2009 | Chang | H04L 63/145 726/11 |
| 2011/0088093 A1* | 4/2011 | Kang | G06F 21/567 726/22 |
| 2020/0034323 A1 | 1/2020 | Maung et al. | |

* cited by examiner

FIG. 1

Table 6-14. Compliance Pattern Sequences

| Compliance Pattern | Value | Description |
|---|---|---|
| CP0 | D0.0 scrambled | A pseudo-random data pattern that is exactly the same as logical idle (refer to Chapter 7) but does not include SKP sequences. |
| CP1 | D10.2 | Nyquist frequency |
| CP2 | D24.3 | Nyquist/2 |
| CP3 | K28.5 | COM pattern |
| CP4 | LFPS | The low frequency periodic signaling pattern |
| CP5 | K28.7 | With de-emphasis |
| CP6 | K28.7 | Without de-emphasis |
| CP7 | 50-250 1's and 0's | With de-emphasis. Repeating 50-250 1's and then 50-250 0's. |
| CP8 | 50-250 1's and 0's | Without de-emphasis. Repeating 50-250 1's and then 50-250 0's. |
| CP9 | | Pseudo-random data pattern (see section 6.4.4.1) |
| CP10 | AAh | Nyquist pattern at 10 Gb/s. This is not 128b132b encoded. |
| CP11 | CCh | Nyquist/2 at 10 Gb/s. This is not 128b132b encoded. |
| CP12 | LFSR15 | Uncoded LFSR15 for PHY level testing and fault isolation. This is not 128b132b encoded. The polynomial is $x^{15}+x^{14}+1$. |
| CP13 | 64 1's and 0's | With pre-shoot defined in section 6.7.5.2 (no de-emphasis). Repeating 64 1's and then 64 0's at 10 Gb/s. This is not 128b132b encoded. |
| CP14 | 64 1's and 0's | With de-emphasis defined in section 6.7.5.2 (no pre-shoot). Repeating 64 1's and then 64 0's at 10 Gb/s. This is not 128b132b encoded. |
| CP15 | 64 1's and 0's | With pre-shoot and de-emphasis defined in section 6.7.5.2. Repeating 64 1's and then 64 0's at 10 Gb/s. This is not 128b132b encoded. |

FIG. 2

Figure 6-32. LFPS Signaling

FIG. 3

Table 6-30. LFPS Transmitter Timing for SuperSpeed Designs[1]

| | tBurst | | | | tRepeat | | |
|---|---|---|---|---|---|---|---|
| | Min | Typ | Max | Minimum Number of LFPS Cycles[2] | Min | Typ | Max |
| Polling.LFPS | 0.6 µs | 1.0 µs | 1.4 µs | | 6 µs | 10 µs | 14 µs |
| ▓▓▓▓▓ | 40 ns | | 200 ns | 2 | 160 ms | 200 ms | 240 ms |
| Ping.LFPS for SuperSpeedPlus[3] | 40 ns | | 160 ns | 2 | 160 ms | 200 ms | 240 ms |
| tReset[2] | 80 ms | 100 ms | 120 ms | | | | |
| U1 Exit[4,5] | 900 ns[7] | | 2 ms | | | | |
| U2 / Loopback Exit[4,5] | 80 µs[7] | | 2 ms | | | | |

USB DEVICE IP INFRINGEMENT IDENTIFICATION METHOD AND TERMINAL BASED ON USB PROTOCOL

FIELD OF THE INVENTION

The present invention relates to USB technology, and specifically to a USB device IP infringement identification method and terminal based on USB protocol.

BACKGROUND OF THE INVENTION

As an IP design company, its customers are chip makers. An IP design company sells completed IP design codes to the chip makers, who integrate IP into their system and then tape out and make chips. There are usually several sales models, simply put, one is one-time buyout payment and another one is pay-per-tape out approach. If the pay-per-tape out approach is used, there is a possibility that the chip maker pays for one tape out of the IP, but the chip maker uses it for multiple tape outs for different products because there is no need to make any change to the IR There is also a case that other companies steal the design codes of the IP design company, tape out and make products. In the above two cases, infringement of the IP design company's legitimate rights and interests will happen, and corresponding infringement identification methods for different IPs are required.

In terms of design flow, IC modules (IP) can be classified into three types: soft IP, firm IP, and hard IP. In respect of soft IP, in the process of designing a logic IC, the IC designer will write a register transfer level (RTL) program using a hardware description language for the functions required by the system after the system specification is formulated, and this RTL file is called a soft IP. The soft IP is provided in the form of source code. Therefore, it is highly flexible and can be modified by a user to achieve a desired circuit system design, and it is independent of the specific implementation process. The disadvantage of soft IP is that the protection of the proprietary intellectual property rights would not be easy, especially for standard protocol IP (e.g., USB 3.0). Even though the code is encrypted, the encryption code of the same IP could be repeatedly used in different SOC projects.

In respect of firm IP, after the RTL program has been simulated and verified to meet the design requirements, the designer will select corresponding logic gates from the Cell Library with the assistance of an electronic design automation tool (EDA) and convert the RTL file into a Netlist file in the form of logic gate cells. The Netlist file is called a firm IP. The firm IP is a compromise between the soft IP and the hard IP. It is more reliable than the soft IP and more flexible than the hard IP, but it still cannot be modified according to the customer's needs like the soft IP.

In respect of hard IP, after the Netlist file is verified, there comes the step of entity design. First, functional block location floor planning, then place & routing. The resulting GDSII file after place & routing of the entity is a hard IP. When the hard IP design is performed, the process has been completed and cannot be modified. The hard IP received by a user is merely a product function, not a product design. Therefore, the design and manufacturing of the hard IP is under full control of the designer, and the IP protection thereof would be relatively simple as compared to the soft IP and firm IP.

A USB device is a widely used standard IP, and effective measures for protecting the intellectual property rights have become an urgent research direction in the industry, but until now the technical problem has not been solved.

In prior art, protection is usually provided by encryption of software or hardware, but there is still a possibility of decryption, especially when soft IP is delivered. Due to high flexibility, the register can be modified by a customer to generate different IP versions. Therefore, it would be easy that the soft IP is modified into multiple versions by a chip maker for tape out. Once the products are made, it would be difficult to identify the infringement, as no matter the software source code or hardware source code, they will be invisible.

SUMMARY OF THE INVENTION

To address the shortcomings of the prior art, it is an objective of the present invention to provide a USB device IP infringement identification method and terminal based on USB protocol.

In order to achieve the above objective, the present invention uses the following technical solution: A USB protocol-based method for identifying IP infringement of a USB device, wherein the method comprises the steps of:

S1: connecting an infringement identification device at a peer side of a USB host to be tested;

S2: the USB host to be tested entering compliance mode;

S3: sending by the infringement identification device an X.LFPS file to the USB host to be tested;

S4: upon receiving the X.LFPS file, the USB host to be tested sending IP copyright information to the infringement identification device;

S5: determining whether the USB host to be tested infringes the copyright based on the IP copyright information.

Preferably, in step S1, a USB protocol analyzer is connected between the USB host to be tested and the infringement identification device.

Preferably, in step S3, the X.LFPS file is different than the LFPS in the USB protocol.

Preferably, in step S4, upon sending by the USB host to be tested the IP copyright information to the infringement identification device, the USB protocol analyzer performs IP copyright information determination by capturing the IP copyright information sent by the USB host to be tested.

Preferably, the USB protocol is USB 3.0 or a higher protocol.

A USB protocol-based IP infringement identification terminal for a USB device, wherein the terminal includes an infringement identification device and a USB protocol analyzer, the infringement identification device is used to make a USB host to be tested enter compliance mode and sends an X.LFPS file to the USB host to be tested; said USB protocol analyzer is used to forward the X.LFPS file sent by the infringement identification device, and forward an IP copyright information sent by the USB host to be tested, and capture the IP copyright information and make a determination.

The present invention has the following advantages: simple in structure, convenient and easy to implement. The infringement identification is performed by using the compliance mode specified in the USB protocol, which is more stable, reliable and can also save costs. The infringement identification method provided in the present invention is more flexible and covert. The present invention can not only identify IP infringement, but also can identify infringement of the products made with the IP.

DETAILED DESCRIPTION OF THE INVENTION

The present invention will be described in detail below with particular embodiments by referring to the accompanying drawings.

According to the USB 3.0 (or higher) protocol, the USB device has a compliance mode at the link layer for testing transmitter and receiver.

According to the USB protocol, the IP of the USB device is in the polling state. When the first LFPS is in timeout entry, the USB device enters the compliance mode and subsequently sends a Ping.LFPS to the peer side.

Generally, the peer side is a dedicated testing device, and the USB device is the device to be tested in this case.

The USB device to be tested will send a compliance pattern upon receipt of the Ping.LFPS.

In the USB protocol, LFPS is described as follows: By designing different tBurst, tRepeat, LFPS can be encoded differently to provide different functions.

Figure 1:
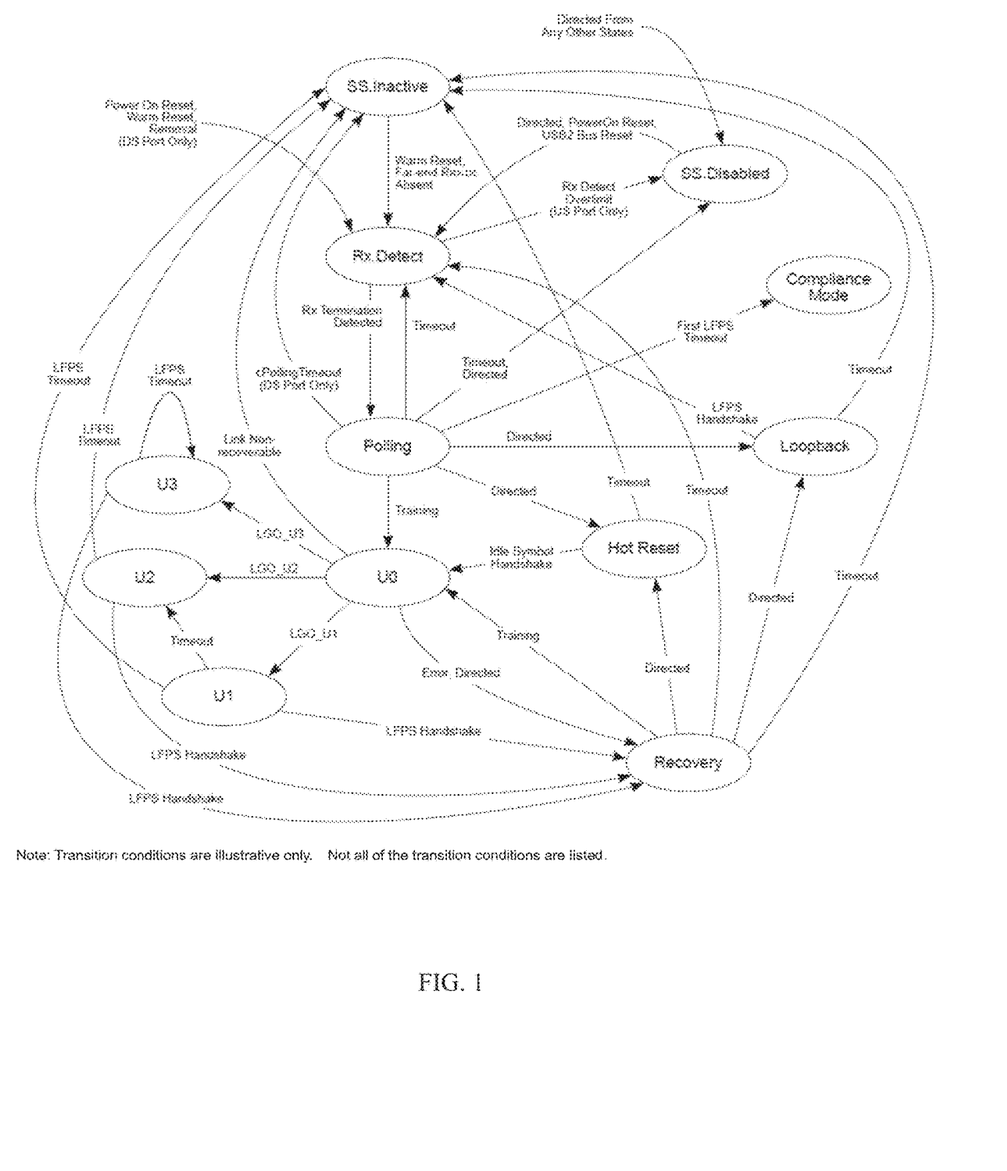
FIG. 1 is a state machine depicted in the standard protocol followed by the present invention.
Figure 2:
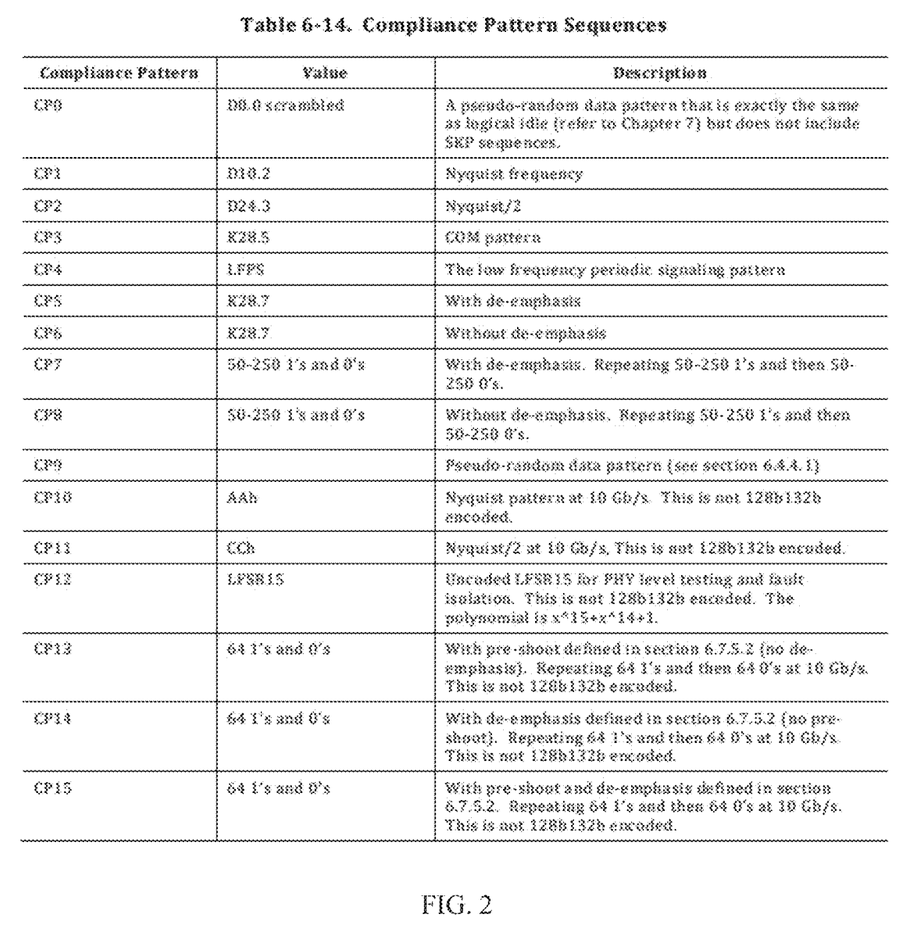
FIG. 2 is a standard sequence supported by the compliance as defined in the USB standard protocol followed by the present invention.
Figure 3:
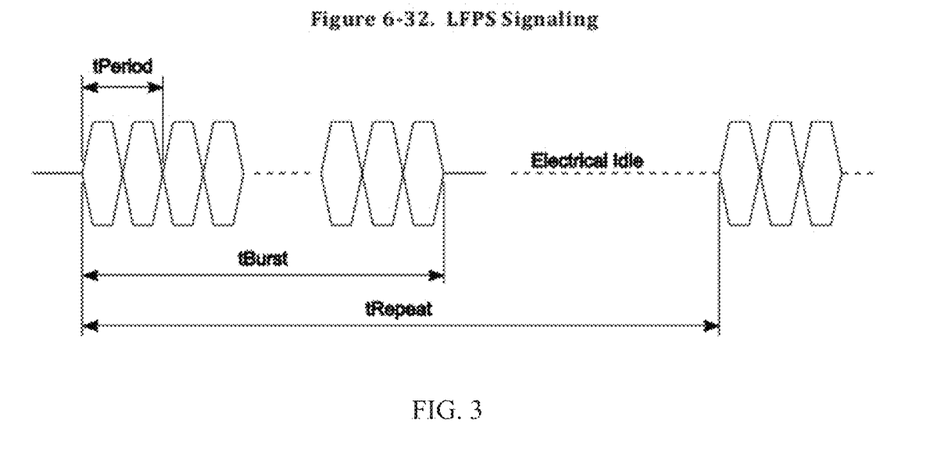
FIG. 3 shows the composition of the LFPS signal of the USB standard protocol followed by the present invention.
Figure 4:
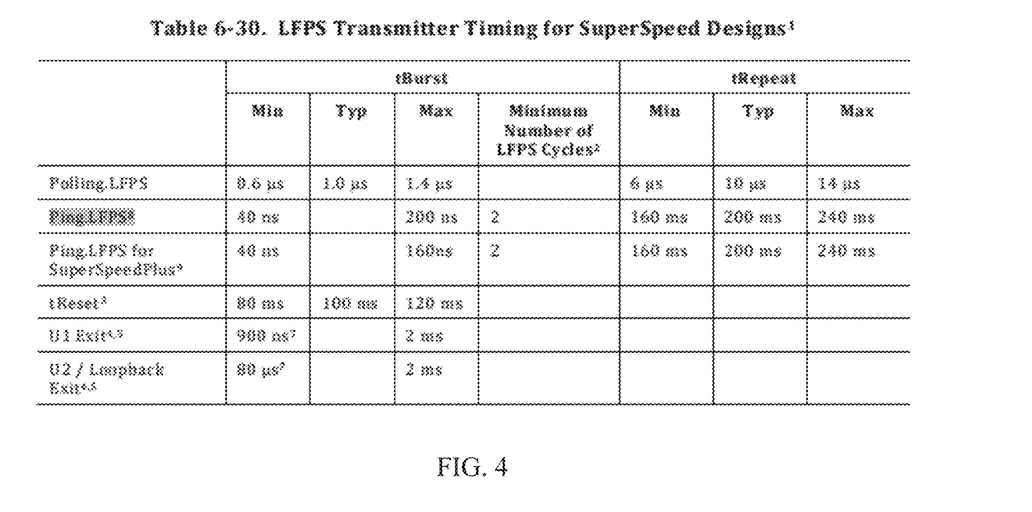
FIG. 4 shows the timing requirements for several LFPS used in the USB standard protocol followed by the present invention.
Figure 5:
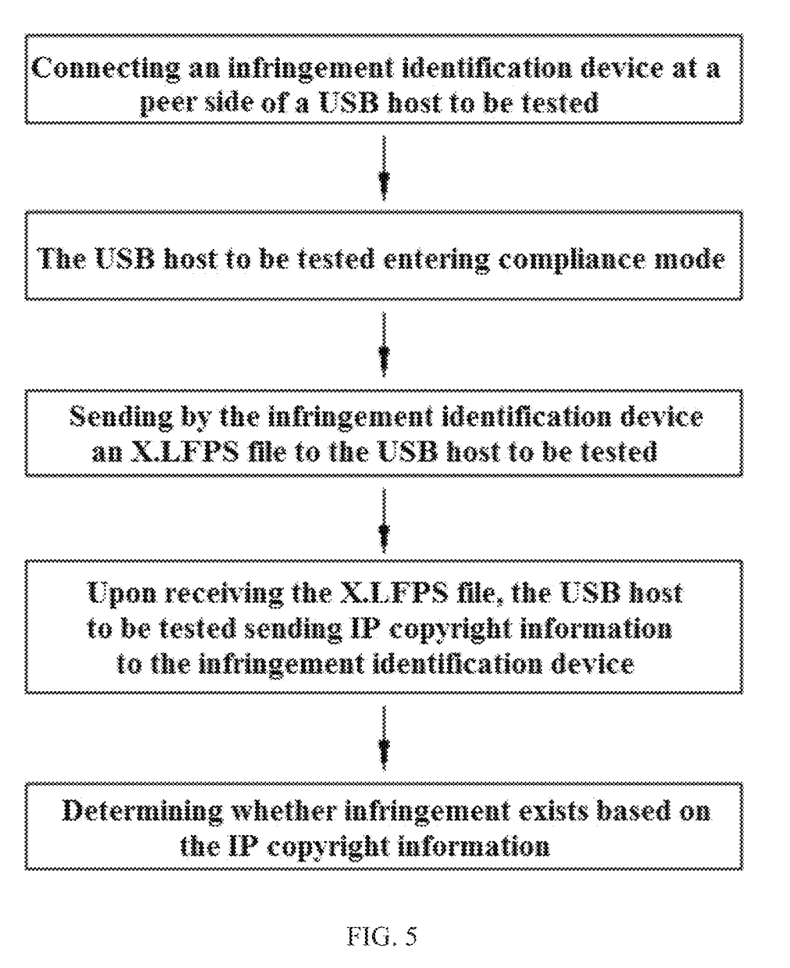
FIG. 5 is a schematic flow diagram of s USB protocol-based IP infringement identification method for a USB device in an embodiment of the present invention.
Figure 6:
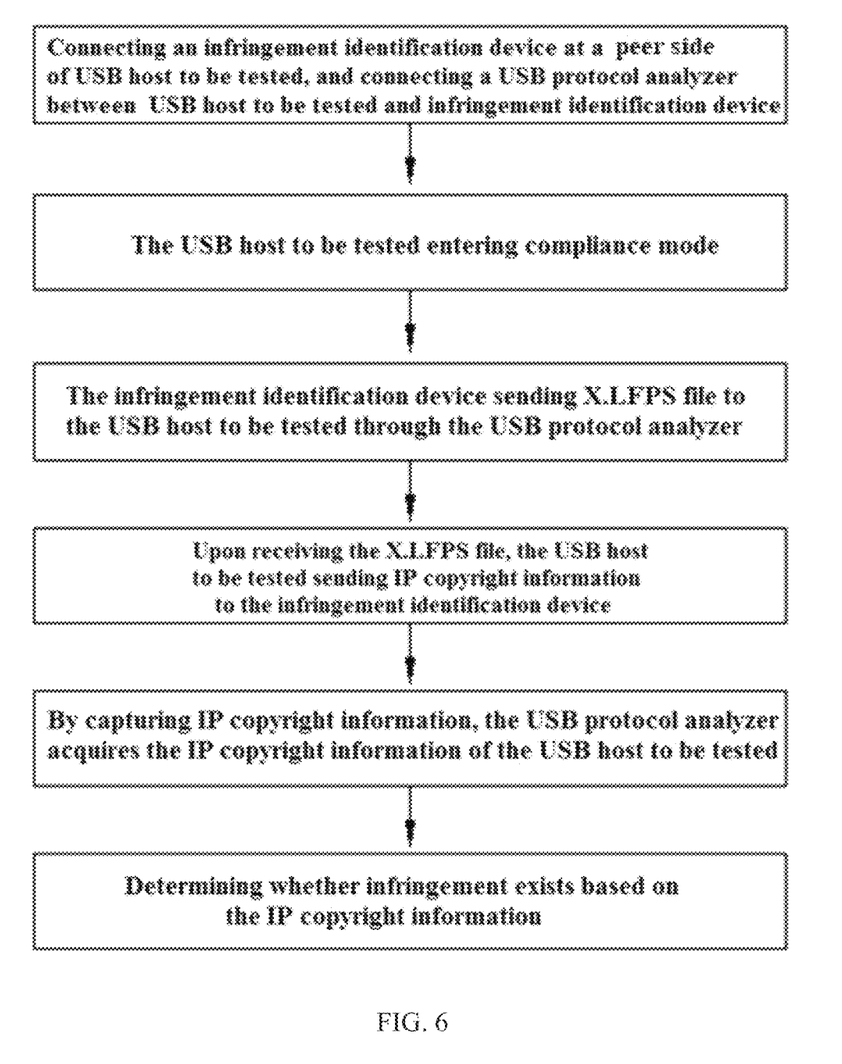
FIG. 6 is a schematic flow diagram of a USB protocol-based IP infringement identification method for a USB device in an embodiment of the present invention.

By referring to FIG. 5 and FIG. 6, the USB protocol-based method for identifying IP infringement of a USB device comprises the steps of:

S1: connecting an infringement identification device at a peer side of a USB host to be tested, and connecting a USB protocol analyzer between the USB host to be tested and the infringement identification device;

S2: the USB host to be tested entering compliance mode;

S3: sending by the infringement identification device an X.LFPS file to the USB host to be tested; the X.LFPS file should be strictly different than Ping.LFPS, and should be different than existing LFPS in the USB protocol; tBurst, tRepeat of LFPS can have many values, as long as they can be sent out and identified effectively;

S4: upon receiving the X.LFPS file, the USB host to be tested sending IP copyright information to the infringement identification device; after the USB host to be tested sends IP copyright information to the infringement identification device, the USB protocol analyzer captures the IP copyright information sent by the USB host to be tested;

S5: determining whether the USB host to be tested infringes the copyright based on the IP copyright information.

The USB protocol of the present invention is USB 3.0 or higher.

Figure 7:
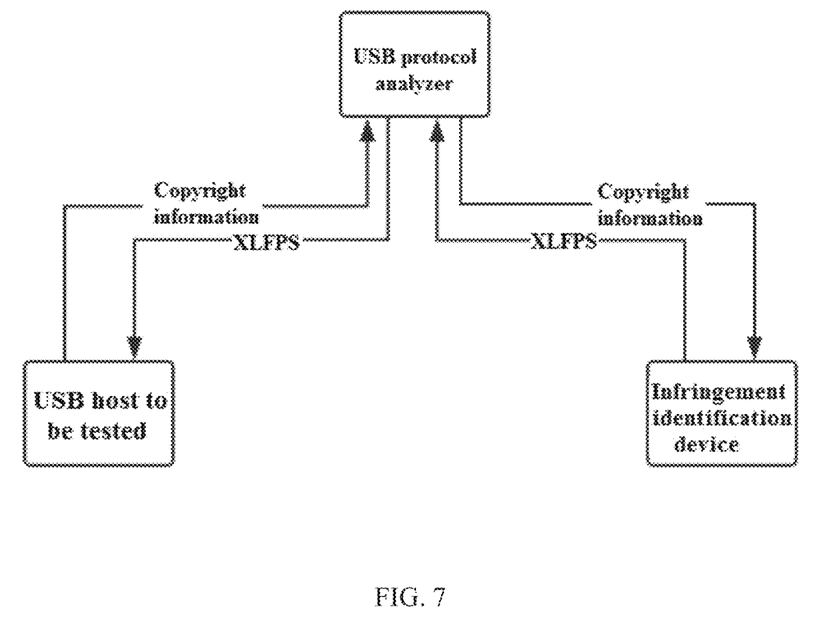
FIG. 7 is a structural connection diagram of a USB protocol-based IP infringement identification terminal for a USB device in an embodiment of the present invention.

Now referring to FIG. 7, a USB protocol-based IP infringement identification terminal for a USB device includes an infringement identification device and a USB protocol analyzer, the infringement identification device is used to make a USB host to be tested enter compliance mode, and sends an X.LFPS file to the USB host to be tested; the USB protocol analyzer is used to forward the X.LFPS file sent by the infringement identification device and forward an IP copyright information sent by the USB host to be tested, and capture the IP copyright information and make a determination.

The present invention has the following advantages: simple in structure, convenient and easy to implement. The infringement identification is performed by using the compliance mode specified in the USB protocol, which is more stable, reliable and can also save costs. The infringement identification method provided in the present invention is more flexible and covert. The present invention can not only identify IP infringement, but also can identify infringement of the products made with the IP.

The foregoing illustrates and describes the basic principles, main features and advantages of the present invention. One skilled in the art should understand that the above embodiments would not limit the present invention in any form. Any technical solution obtained by means of equivalent substitution or equivalent transformation falls within the scope of the present invention.

What is claimed is:

1. A USB protocol-based method for identifying IP infringement of a USB device, wherein the method comprises the steps of:
    S1: connecting an infringement identification device at a peer side of a USB host to be tested;
    S2: the USB host to be tested entering compliance mode;
    S3: sending by the infringement identification device an X.LFPS file to the USB host to be tested, wherein the X.LFPS file is different than LFPS in the USB protocol;
    S4: upon receiving the X.LFPS file, the USB host to be tested sending IP copyright information to the infringement identification device;
    S5: determining whether the USB host to be tested infringes the copyright based on the IP copyright information.

2. The USB protocol-based method for identifying IP infringement of a USB device according to claim 1, wherein in step S1, a USB protocol analyzer is connected between the USB host to be tested and the infringement identification device.

3. The USB protocol-based method for identifying IP infringement of a USB device according to claim 2, wherein in step S4, upon sending by the USB host to be tested the IP copyright information to the infringement identification device, the USB protocol analyzer makes IP copyright information determination by capturing the IP copyright information sent by the USB host to be tested.

4. The USB protocol-based method for identifying IP infringement of a USB device according to claim 1, wherein the USB protocol is USB 3.0 or a higher protocol.

5. A USB protocol-based IP infringement identification terminal for a USB device, wherein the terminal comprises: an infringement identification device and a USB protocol analyzer, the infringement identification device is used to make a USB host to be tested enter compliance mode and sends an X.LFPS file to the USB host to be tested; said USB protocol analyzer is used to forward the X.LFPS file sent by the infringement identification device, and forward an IP copyright information sent by the USB host to be tested, and capture and determine the IP copyright information, wherein the X.LFPS file is different than LFPS in the USB protocol.

\* \* \* \* \*